UNITED STATES PATENT OFFICE.

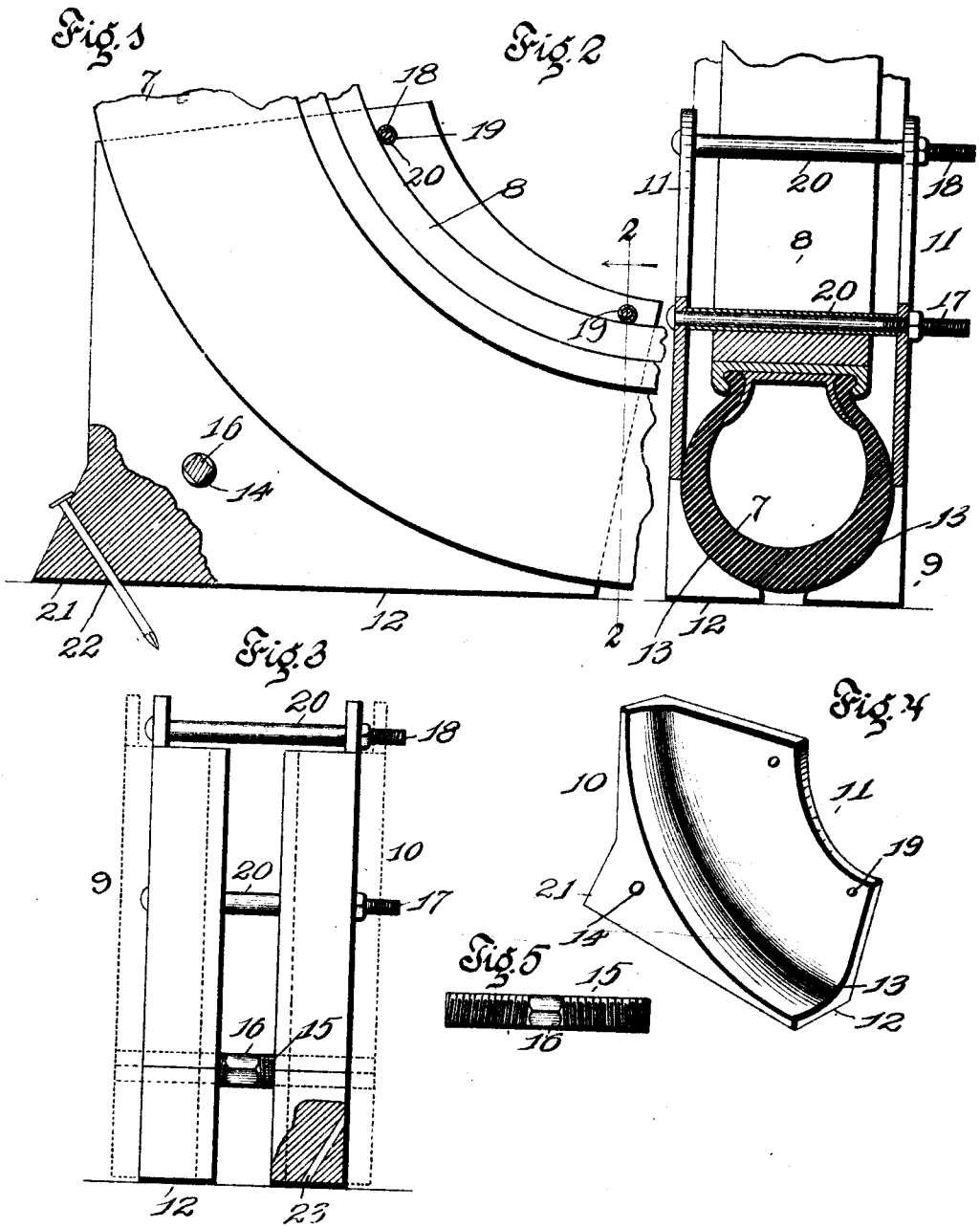

ARCHIBALD S. McMILLAN AND JOSEPH F. CURDIE, OF ST. LOUIS, MISSOURI.

SHIPPING-SHOE FOR AUTOMOBILE-WHEELS AND THE LIKE.

1,139,988.    Specification of Letters Patent.    Patented May 18, 1915.

Application filed February 2, 1914. Serial No. 815,908.

*To all whom it may concern:*

Be it known that we, ARCHIBALD S. MC-MILLAN and JOSEPH F. CURDIE, citizens of the United States, and residents of St. Louis, Missouri, have invented certain new and useful Improvements in Shipping-Shoes for Automobile-Wheels and the like, of which the following is a specification.

This invention relates to improvements in a shipping shoe for automobile wheels and the like, and has for its object a two-piece member arranged to conform with the contour of the wheel and firmly clamped thereon, and whereby the wheel by means of said shoe is held in rigid position on a freight car to retain the vehicle rigid during shipment.

A further object of our invention is to construct a shoe which is adjustable and can be clamped to any size wheel, and is used particularly for supporting the vehicle on the floor of a freight car so as to prevent the vehicle from moving from its position and becoming in any way injured during the jolting movement of the train.

A further object of our invention is to construct a shoe which can be adjusted and firmly secured to a vehicle wheel more particularly an automobile. The same to be used to support the vehicle on the floor of a railway car, or prevent the vehicle from being stolen when the shoe is applied or placed in position on any one of the wheels while the machine is idle at any particular location.

Figure 1, is a view of the inner side of one of the members constituting our improved shipping shoe, a part being broken away and in section showing the manner of securing the shoe to the floor of a railway car. Fig. 2, is a sectional view taken on the line 2—2 of Fig. 1. Fig. 3, is a rear view of our improved shoe. Fig. 4, is a detail perspective view of one of the members constituting the shoe. Fig. 5, is a detail view of the threaded stud made use of for adjusting the width of the shoe.

Referring to the drawings in detail 7 indicates the tire of an ordinary vehicle such as an automobile and 8 the rim to which the tire is secured. On this tire and rim is adapted to be placed our improved shoe which consists of two members 9 and 10, each member constructed of a side portion 11, and a bottom portion 12. The inner surface is suitably rounded as indicated by the numeral 13, and is so shaped as to conform with the contour of the tire.

Each member is provided with an internally screw threaded bore 14, in which is inserted a screw threaded stud 15. The center portion of said stud is preferably provided with rectangular surfaces 16, and the ends screw threaded. One side having a right hand screw thread and the other side a left hand screw thread. These threads correspond with like threads in the side members which constitute the shoe. By this arrangement the sides can be readily and easily adjusted to fit any width of tire so that the shoe can be firmly clamped thereon. In addition to this stud we provide fastening devices such as bolts 17 and 18, which are passed through apertures 19, formed in the sides and located above the rim 8. These bolts are properly tightened when the shoe is set and around the bolts is placed a tubing, or other packing material 20, so as to prevent scratching or marring of the rim of the wheel.

The rear edges of the members which constitute the shoe are flared slightly outward, as indicated by the numeral 21, and in the same are formed angular apertures 22, through which a nail or other device is passed for firmly fixing the shoe to the floor of a freight car. The sides of each member are also provided with like apertures 23, and through which are passed similar fastening devices for supporting the shoe in position.

The essential feature of our invention is to construct a shoe of two sections, the inner surface of which is properly shaped to register with the contour of a wheel and arranged to be adjusted in position, and the said shoes when attached to each wheel is firmly fastened to the floor of a freight car so that the vehicle is held rigid during shipment.

The shoes are constructed of rigid material and the same after having been removed from the position after the vehicle has reached its destination can be sent back to the factory and be used over again.

By this arrangement of shoe it dispenses with the bracing of the machines in the car by using timbers and wooden blocks which has been deemed as a waste and places the shipper at considerable expense, as good timbers are sawed for such braces and can be used for no other purpose.

Having fully described our invention what we claim is:

1. A shoe of the class described comprising two members, the surface of the inner circumferential edge of each shaped to conform with the outer contour of the tire and rim of a wheel, a screw threaded adjusting stud for regulating the width of the members and bolts for locking the same over the rim, substantially as specified.

2. A shipping shoe for automobiles and the like comprising two members each constructed of rigid material, their inner surfaces arranged to conform with the contour of the tire of a vehicle wheel, an adjusting screw for regulating the width of the two members, bolts for securing said members together on the wheel, each member having apertures through which fastening devices are passed for supporting the shoe in rigid position on the floor of a freight car.

In testimony whereof, we have signed our names to this specification, in presence of two subscribing witnesses.

ARCHIBALD S. McMILLAN.
JOSEPH F. CURDIE

Witnesses:
ALFRED A. EICK,
WALTER C. STEIN.